UNITED STATES PATENT OFFICE.

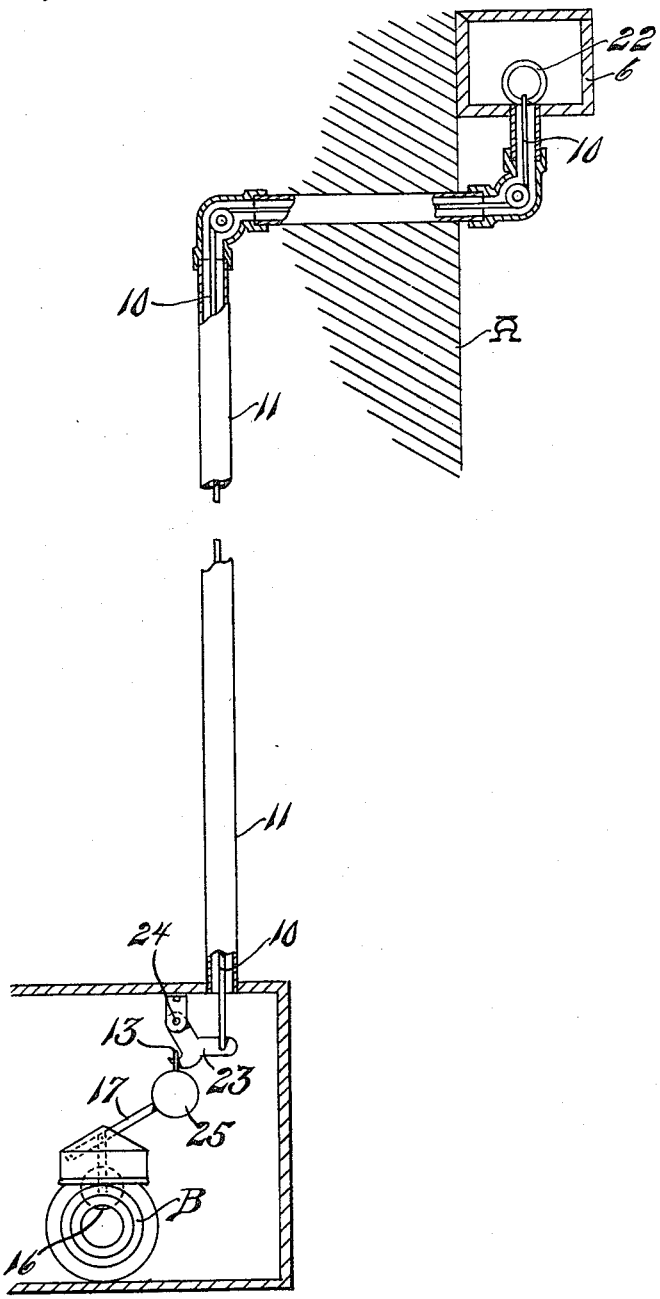

JOSEPH DUB, OF CLEVELAND, OHIO.

GAS-VALVE SHUT-OFF.

1,069,681.     Specification of Letters Patent.     Patented Aug. 12, 1913.

Application filed February 17, 1913. Serial No. 748,968.

*To all whom it may concern:*

Be it known that I, JOSEPH DUB, citizen of the United States, residing at Cleveland, in the county of Cuyahoga and State of Ohio, have invented certain new and useful Improvements in Gas-Valve Shut-Offs, of which the following is a specification.

This invention relates to that class of gas valves controlled by thermo or other devices, for the purpose of cutting off the flow of gas to a building, either from the outside or from the inside, the apparatus being particularly serviceable in case of fire, whereby it may be operated by a person on the outside of a building, or, by means of fusible devices, will operate automatically in the event of fire inside the building.

The object of the invention is to produce a simple and efficient apparatus of the kind stated.

The invention is illustrated in the accompanying drawings in which the figure is a sectional view illustrating one form of the device.

Referring specifically to the drawings, 6 indicates a box located on the outside of a building, the wall of which is indicated at A. This box may be provided with a breakable cover, or with any other device to prevent convenient access thereto by mischievous persons. The gas main or pipe supplying the gas to the building is indicated at B, and it is provided with a valve 16 the stem of which is connected to a lever 17 which is weighted as indicated at 25. 23 is a hook which, in the form shown in the figure engages a fusible eye 13 on the weight 25, the hook being pivoted at 24 to any convenient bracket or support. One arm of the hook is connected to a rope or cable 10 which extends through a pipe 11 which communicates with the box 6, and at the end the rope may have a ring 22 whereby it may be pulled.

The hook engaging the eye 13 supports the weight and holds the valve in open position. In the event of fire, by opening the box 6 and pulling the ring 22 the hook is disengaged from the weight which drops and thereby closes the valve. Or, if the eye 13 is exposed to the fire it will melt and break, and thereby drop the valve.

What I claim as new is:

The combination of a valve, a weighted operating device connected thereto, and provided with a fusible eye, a pivoted hook engaging said eye and normally held in engagement therewith by the weight, to sustain the latter and hold the valve open, and a rope connected to the hook, to operate the same and release the weight.

In testimony whereof, I do affix my signature in presence of two witnesses.

JOSEPH DUB.

Witnesses:
    JOHN A. BOMMHARDT,
    C. L. TERRY.